United States Patent [19]

Gooley

[11] 4,179,956
[45] Dec. 25, 1979

[54] WIRE STRIPPING TOOL

[75] Inventor: Marshall J. Gooley, West Bloomfield, Mich.

[73] Assignee: Daniels Manufacturing Corp., Bloomfield Hills, Mich.

[21] Appl. No.: 870,028

[22] Filed: Jan. 16, 1978

[51] Int. Cl.² .............................................. H02G 1/12
[52] U.S. Cl. .................................. 81/9.5 R; 30/90.8
[58] Field of Search ...................... 30/90.1, 90.2, 90.8; 81/9.5 R, 9.5 B, 9.5 C

[56] References Cited

U.S. PATENT DOCUMENTS

| | | | |
|---|---|---|---|
| 1,165,176 | 12/1915 | Hornor | 81/9.5 C X |
| 2,761,211 | 9/1956 | Grant | 30/90.8 |
| 3,215,007 | 11/1965 | Stallings | 81/9.5 R |
| 3,769,705 | 11/1973 | Biddle | 30/90.1 |
| 4,059,893 | 11/1977 | Solury | 81/9.5 R X |

FOREIGN PATENT DOCUMENTS 1323679  7/1973  United Kingdom ..................... 30/90.1

Primary Examiner—James L. Jones, Jr.
Assistant Examiner—James G. Smith
Attorney, Agent, or Firm—Harness, Dickey & Pierce

[57] ABSTRACT

A hand-operated tool for scoring or severing the outer insulation layer or layers of insulated wire to enable the same to be removed from such wire. The tool includes a U-shaped member having a cutter block fixedly attached and a body member slidably attached thereto, with at least one circular blade eccentrically and adjustably mounted on the cutter block to transversely engage an insulated wire supported by the body member.

17 Claims, 4 Drawing Figures

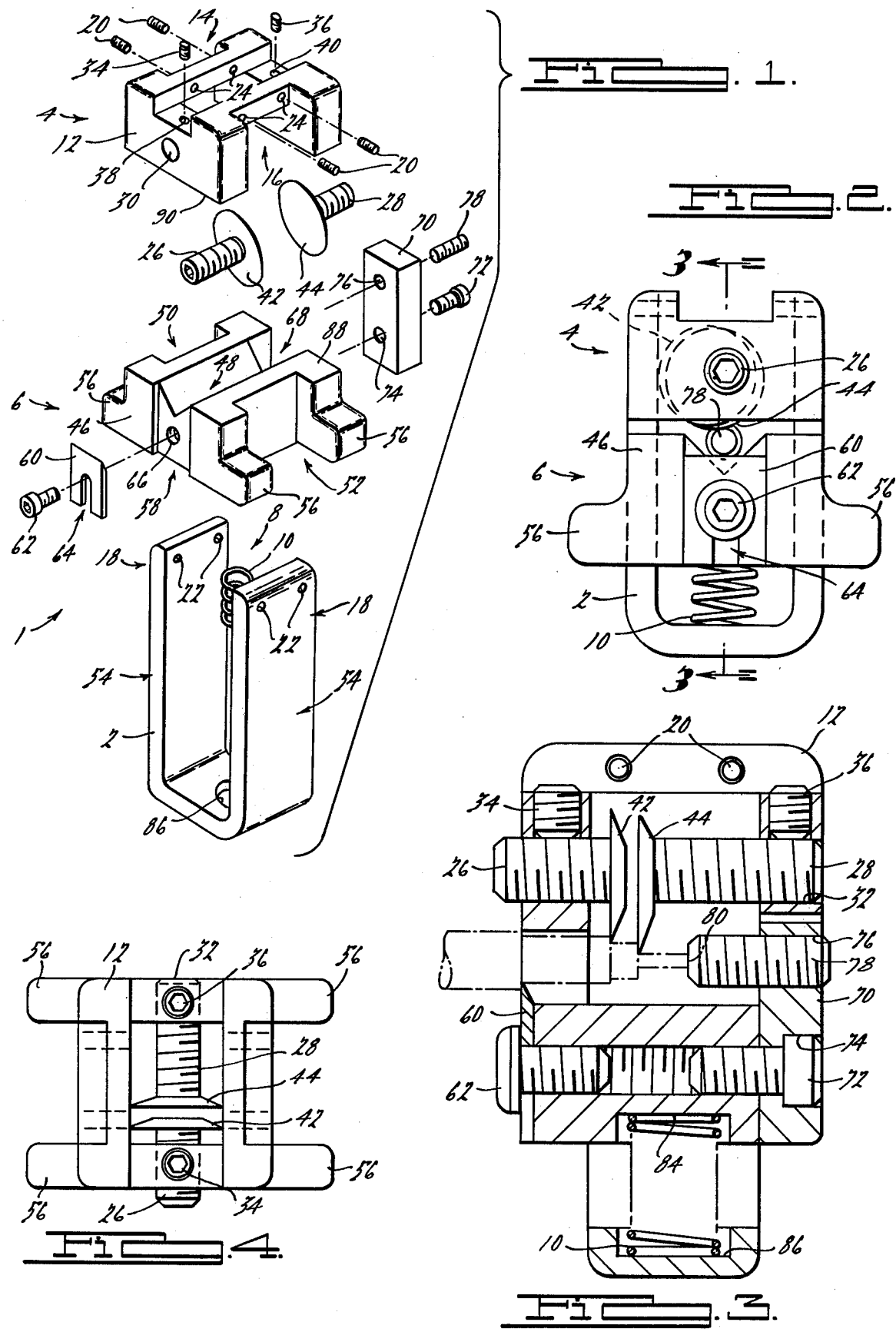

WIRE STRIPPING TOOL

BACKGROUND AND SUMMARY OF THE INVENTION

The present invention relates to hand-operated tools for stripping the outer insulation from insulated wire. The tool is particularly useful for preparing coaxial cables for connectors because it can score or sever, in a single operation, more than one layer of insulation.

Insulated wire and coaxial cables are commonplace today as well as are tools used for stripping insulation therefrom. Prior art examples of tools for stripping insulation from a wire or cable are disclosed in U.S. Pat. Nos. 3,377,891, issued Apr. 16, 1968 to Horrocks; 3,869,791, issued Mar. 11, 1975 to Horrocks; 3,600,983, issued Aug. 24, 1971 to Hendry; 2,346,314, issued Apr. 11, 1944 to Lembitz et al; 3,082,523, issued Mar. 26, 1963 to Modes et al; 3,813,966, issued June 4, 1974 to Knuth; and 3,215,007, issued Nov. 2, 1965 to Stallings. There remains, however, a need for an improved wire stripping tool and in particular for an improved tool designed to sever, in a single operation, the insulation and outer conducting layers of coaxial cable to prepare it for connectors.

Therefore, it is one object of the present invention to provide a practical, economically manufactured, easily manipulated, hand-operated tool for stripping insulation from wires of varying diameters. A further object of this invention is to provide a tool having a plurality of cutting blades which can be easily adjusted not only for depth of cut but also for length of cut thereby providing a tool particularly adapted to sever the insulation and outer conducting layers of coaxial cable to prepare it for connectors.

These and other objects are achieved by the manually operable wire stripping tool of the present invention which comprises a cutter block having at least one circular cutter blade, eccentrically and adjustably mounted thereon, and a means for biasing a wire toward said cutter blade. In a preferred embodiment, a manually operable tool of the present invention includes a U-shaped rail which has a cutter block assembly fixedly attached and a body assembly slidable attached thereto, said cutter block assembly having a plurality of circular cutter blades, eccentrically and adjustably mounted thereon, and said body assembly having cable supporting means.

BRIEF DESCRIPTION OF THE DRAWINGS

In the drawings:

FIG. 1 is an exploded view showing the parts of a wire stripping tool of the present invention in their respective positions before assembly;

FIG. 2 is a front elevational view of an assembled tool of FIG. 1;

FIG. 3 is a sectional view taken on line 3—3 of FIG. 2; and

FIG. 4 is a top elevational view of the tool of FIG. 2.

DESCRIPTION OF THE INVENTION

Referring now to the drawings, a preferred embodiment of the coax stripping tool of the present invention, generally indicated by the numeral 1, includes U-shaped rail 2, cutter block assembly 4 and body assembly 6. Cutter block assembly 4 is fixedly attached to the open end 8 of U-shaped rail 2. Body assembly 6 is slidably attached to U-shaped rail 2 and is biased toward cutter block assembly 4 by spring 10. It is contemplated that all parts of the tool will be made of a suitable metal or an equivalent substitute such as a hard, durable plastic material. The exact size of the tool is not critical, however, it has been found that a tool having a height of about two inches and proportioned as in the drawings will be easily manipulated and suitable for use with common sizes of wires and cables.

Cutter block assembly 4 comprises cutter block 12 which is in the shape of two facing blocks with tops joined together by transverse blocks with all blocks having parallel faces and, optionally, rounded corners. Cutter block 12 has a pair of notches 14 and 16 into which fit ends 18 of U-shaped rail 2. Press fit lock pins 20 extend through bores 22 in U-shaped rail 2 and seat in bores 24, thereby fixedly attaching cutter block 12 to U-shaped rail 2. Cutter block 12 carries short shank 26 and long shank 28 which closely but slidably fit into smooth bores 30 and 32, respectively. Set screws 34 and 36 extend through threaded bores 38 and 40 to secure short shank 26 and long shank 28 in longitudinal and rotational position. Circular cutter blades 42 and 44 are fixedly and eccentrically mounted to the ends of short shank 26 and long shank 28, respectively. Thus, as will be apparent to those skilled in the art, the depth of cut of each of circular cutter blades 42 and 44 can be adjusted by rotating short or long shank 26 or 28, respectively, while their longitudinal or axial location can be adjusted by slidably locating short or long shank 26 or 28 in the desired longitudinal or axial position. It is a particular advantage of the present invention that the depth of cut of each eccentric blade can be adjusted to very fine tolerances if the blade is mounted only slightly off-center.

Body assembly 6 comprises body 46 which has a V-shaped groove, generally indicated by numeral 48, longitudinally extending in its upper surface which is suitable to support wires or coaxial cables of varying sizes. Body 46 is characterized by side notches 50 and 52 into which slidably fit legs 54 of U-shaped rail 2. Projections 56 of body 46 extend laterally beyond U-shaped rail 2 and are adapted to be pressed by an operator's fingers during use of the tool 1. The front face of body 46 has a notch 58 which receives and supports straight blade 60 which is adjustably mounted on body 46 by screw 62 which passes through slot 64 and engages threaded bore 66 in body 46. The rear surface of body 46 has a notch 68 into which stop block 70 fits and is secured by screw 72 which passes through bore 74 which can be countersunk as shown in the drawing, and engages threaded bore 66 in the rear face of body 46. Stop block 70 has a bore 76 in which screw 78 is threadably and adjustably located to provide an adjustable stop against which cable end 80 abuts.

Spring 10 is compressed between body 46 and U-shaped rail 2 to bias body assembly 6 towards cutter assembly 4. One end of spring 10 is seated in circular indentation 84 in the undersurface of body 46 while the other end of spring 10 is seated in circular indentation 86 in U-shaped rail 2.

The operation of tool 1 of the present invention will be readily apparent to those skilled in the art. The tool is opened by applying pressure manually to urge body assembly 6 downward against the pressure of spring 10. The end of a coaxial cable or other wire is then inserted to supportably lie on straight blade 60 and V-shaped groove 48 until the end of the cable or wire abuts against the end of screw 78 projecting through stop block 70. The axial location of the end of screw 78 can be adjusted to adjust the length of cable or wire to be inserted in the tool 1 by turning screw 78 thereby adjusting its axial location with respect to stop block 70 and in consequence with respect to circular cutter blades 42 and 44 and straight blade 60.

Upon release of the manual pressure urging body assembly 6 against the pressure of spring 10, body assembly 6 is pressed against the cable which in turn is pressed against cutter block assembly 4. Rotation of tool 1 about the axis of the cable, or rotating the cable within the tool 1 causes circular cutter blades 42 and 44 and straight blade 60 to sever the portion of cable insulation or sheath within their respective cutting depths. The top surface 88 of body 46 abuts against the bottom surface 90 of cutter block 12 thereby limiting the depth of cut of circular blades 42 and 44 and straight blade 60.

While a preferred embodiment of the present invention has been described and illustrated above, it is to be understood that the invention may be varied within the scope of the appended claims without departing from the spirit of the invention.

What is claimed is:

1. A manually operable tool for stripping insulation from insulated wires comprising: a base structure; a cutter holding member mounted on said base structure and having at least one circular cutter blade adjustably mounted thereon eccentrically with respect to the center of said cutter blade, a cable supporting means mounted on said base structure, and means for spring biasing said cutter holding member and said cable supporting means toward each other.

2. A tool as recited in claim 1 wherein said cutter holding member supports a shaft and said circular cutter blade is mounted on said shaft.

3. A tool as recited in claim 2 wherein said circular cutter blade is eccentrically mounted on said shaft.

4. A tool as recited in claim 3 wherein said shaft is adjustably mounted on said cutter holding member, said shaft being axially slidable with respect thereto.

5. A tool as recited in claim 4 wherein said shaft is rotatably mounted on said cutter holding member.

6. A manually operable tool for stripping insulation from insulated wires comprising: a rail member having a cutter block fixedly attached and a body member slidably attached thereto; said body member having cable supporting means; at least one circular cutter blade adjustably mounted on said cutter block eccentrically with respect to the center of said cutter blade, and spring means urging said body member towards said cutter block.

7. A tool as recited in claim 6 wherein said circular cutter blade is eccentrically mounted on a shaft supported by said cutter block.

8. A tool as recited in claim 7 wherein said shaft is axially slidable in said cutter block.

9. A tool as recited in claim 8 wherein said shaft is rotatably mounted in said cutter block.

10. A tool as recited in claim 8 wherein said body member has a cutter blade adjustably mounted thereon.

11. A manually operable tool for stripping insulation from insulated wires comprising: a U-shaped rail; a cutter block fixedly attached to said U-shaped rail; an eccentrically mounted circular cutter blade attached to said cutter block, said circular cutter blade being attached to a shaft adjustably mounted in said cutter block; a body member slidably attached to said U-shaped rail, said body member being adapted to support a cable in contact with said circular cutter blade; and a second cutter blade adjustably mounted on said body member.

12. A tool as recited in claim 11 wherein said body member is biased toward said cutter block by a spring compressed between said body member and said U-shaped rail.

13. A tool as recited in claim 12 wherein said body member has a stop block attached thereto, said stop block having an adjustable bolt adapted to abut against a cable inserted in said tool.

14. A manually operable tool for stripping insulation from insulated wires comprising: a rail member having a cutter block fixedly attached and a body member slidably attached thereto, said body member having cable supporting means; a pair of circular cutter blades eccentrically and adjustably mounted on said cutter block, said cutter blades mounted to engage a cable at different locations along its length, and a spring means urging said body member towards said cutter block.

15. A tool as recited in claim 14 wherein each of said cutter blades is mounted on a shaft which is adjustably mounted in a bore in said cutter block.

16. A tool as recited in claim 15 wherein said cable supporting means is a V-shaped groove in said body member and wherein said body member has a stop block attached thereto, said stop block having a bolt adapted to abut against a cable end.

17. A tool as recited in claim 14 wherein said rail member is U-shaped.

* * * * *